United States Patent

Mader et al.

[11] Patent Number: 5,821,419
[45] Date of Patent: Oct. 13, 1998

[54] MICROMECHANICAL SENSOR UNIT FOR DETECTING ACCELERATION

[75] Inventors: Gerhard Mader, Thalmassing; Jens Noetzel, Bremen; Steffen Schulze, Lilienthal, all of Germany

[73] Assignee: Siemens Aktiengesellschaft, Munich, Germany

[21] Appl. No.: 721,564

[22] Filed: Sep. 26, 1996

[30] Foreign Application Priority Data

Mar. 30, 1994 [DE] Germany .......................... 44 11 130.4

[51] Int. Cl.⁶ ...................................... G01P 1/02
[52] U.S. Cl. ...................................... 73/493; 73/514.38
[58] Field of Search ................ 280/735; 200/61.44, 200/61.45 R; 340/436; 73/493, 514.01, 514.16, 514.38

[56] References Cited

U.S. PATENT DOCUMENTS

| | | |
|---|---|---|
| 3,889,232 | 6/1975 | Bell . |
| 4,855,544 | 8/1989 | Glenn . |
| 4,873,868 | 10/1989 | Pierre et al. . |
| 4,882,933 | 11/1989 | Petersen ............... 73/514.38 |
| 4,991,682 | 2/1991 | Kuntz ................ 200/61.45 R |
| 5,103,667 | 4/1992 | Allen et al. . |
| 5,134,306 | 7/1992 | Schumacher ............ 280/735 |
| 5,192,395 | 3/1993 | Boysel .................. 156/656 |
| 5,233,141 | 8/1993 | Breed ................ 200/61.45 R |
| 5,591,910 | 1/1997 | Lin ..................... 73/514.38 |

FOREIGN PATENT DOCUMENTS

| | | |
|---|---|---|
| 0 480 274 A1 | 4/1992 | European Pat. Off. . |
| 0 526 923 A1 | 2/1993 | European Pat. Off. . |
| 0 567 938 A1 | 11/1993 | European Pat. Off. . |
| 266 841 | 5/1913 | Germany . |
| 2 014 210 | 10/1971 | Germany . |
| 24 38 842 | 3/1975 | Germany . |
| 37 26 145 C1 | 11/1988 | Germany . |
| 38 05 161 A1 | 8/1989 | Germany . |
| 41 03 589 A1 | 8/1992 | Germany . |
| 87/06347 | 10/1987 | WIPO . |
| 89/11658 | 11/1989 | WIPO . |
| 90/02062 | 3/1990 | WIPO . |

OTHER PUBLICATIONS

"Fabrication of Capacitive Acceleration Sensors by the LIGA Technique", (Burbaum et al.), Nuclear Research Center Karlsruhe, No. 21–01, pp. 559–563. 1991 (no month).

Primary Examiner—Christine K. Oda
Attorney, Agent, or Firm—Herbert L. Lerner; Laurence A. Greenberg

[57] ABSTRACT

A micromechanical sensor unit for detecting acceleration has pendulums each with a spiral spring and a seismic mass. Supports each being connected to a respective one of the pendulums, and position sensors, each two of the position sensors is associated with a respective one of the pendulums. Each position sensor and an associated pendulum form a switch with a defined triggering threshold and at least two switches respond to the same direction of acceleration. At least one switch is a safing sensor with a separate tap of a sensor signal.

4 Claims, 1 Drawing Sheet

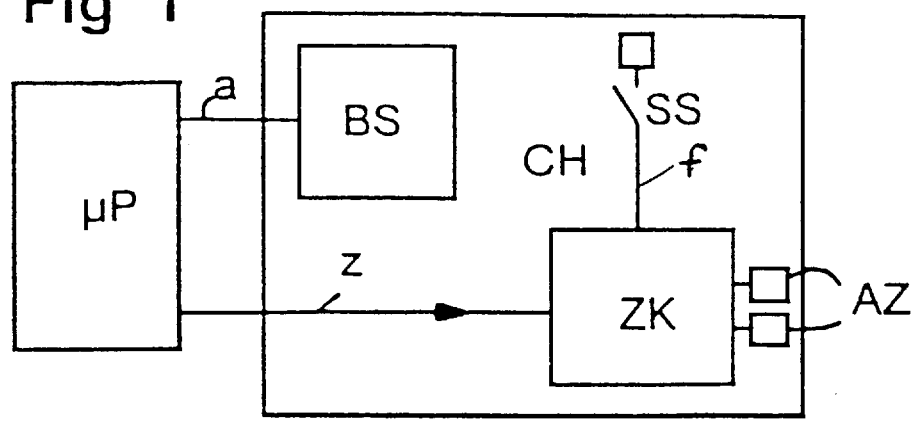
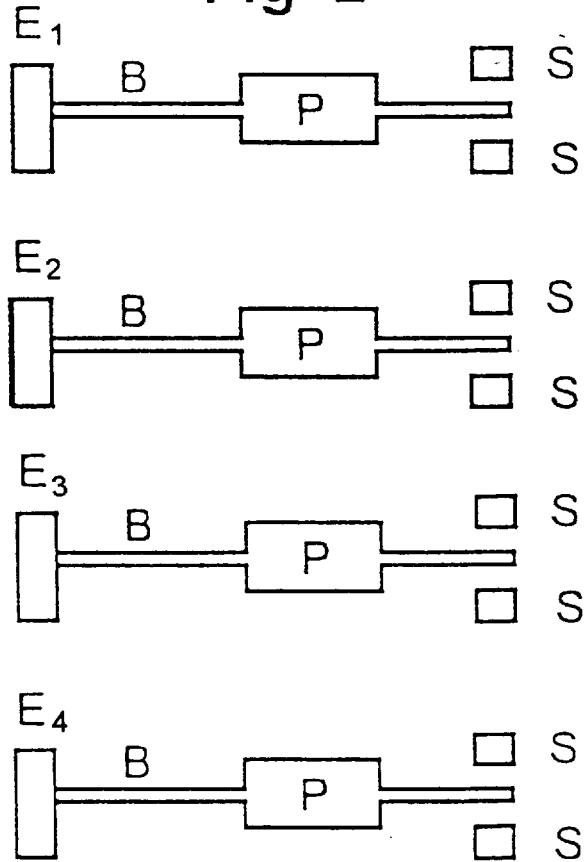

MICROMECHANICAL SENSOR UNIT FOR DETECTING ACCELERATION

CROSS-REFERENCE TO RELATED APPLICATION

This application is a Continuation of International Application Ser. No. PCT/DE95/00429, filed Mar. 30, 1995.

BACKGROUND OF THE INVENTION

FIELD OF THE INVENTION

The invention relates to a micromechanical sensor unit for detecting acceleration, having at least two pendulums with a seismic mass arranged on a spiral spring and with one position sensor per pendulum. Each pendulum and its position sensor interact as a switch, each switch having a response threshold which is determined by its component-specific properties. Each switch supplies a sensor signal as soon as the pendulum reaches or touches the position sensor under the effect of a sufficiently large acceleration force. At least two switches are sensitive to one direction of acceleration. If the acceleration force acting on the sensor unit increases, the number of switches which are sensitive to this direction of acceleration and which supply a sensor signal also increases. Such a sensor unit can be used to actuate, in particular, motor vehicle occupant protection systems, for example air bags and seat belt pretensioners.

In the case of a sensor unit disclosed in European Patent Application 0 567 938 A1, each switch is arranged on a carrier aligned in the horizontal plane, and is sensitive to acceleration perpendicularly to the longitudinal axis of its spiral spring. In the case of a sufficiently large acceleration force in the z direction, the pendulum is moved toward the carrier, touches there an electrode which is arranged under the pendulum and generates a sensor signal. Each sensor signal is stored in a memory cell. An evaluation unit reads the memory cells out at a prescribed frequency, evaluates their content and then, if appropriate, actuates motor vehicle occupant protection systems.

In the case of such a control device, a failure or a malfunction of the evaluation unit can cause incorrect triggering of vehicle occupant protection systems.

SUMMARY OF THE INVENTION

It is accordingly an object of the invention to provide a micromechanical sensor unit for detecting acceleration, which overcomes the herein mentioned disadvantages of the heretofore-known devices and which provides a sensor unit small, low in weight, and lightweight.

With the foregoing and other objects in view there is provided, in accordance with the invention, a control device for triggering a safety device in a motor vehicle, comprising a common carrier, an ignition circuit, an acceleration sensor unit being of micromechanical construction and disposed on the common carrier. The acceleration sensor unit supplies sensor signals.

There is an evaluation circuit for evaluating the sensor signals and it supplies an ignition signal to the ignition circuit. There is a safing sensor being of micromechanical construction and disposed on the common carrier supplying a further sensor signal to the ignition circuit for the detection of acceleration. The ignition circuit triggers the safety device when the ignition signal and the further sensor signal are present at the ignition circuit simultaneously. The safing sensor has a pendulum with a spiral spring and a seismic mass, a support is connected to the pendulum and a position sensor. The position sensor and the pendulum form a switch with a defined triggering threshold. The acceleration sensor unit has at least one pendulum with a spiral spring and a seismic mass, at least one support is connected to the at least one pendulum, and at least two position sensors. Each of the at least two position sensors is associated with the at least one pendulum for forming a switch with a defined triggering threshold. At least two of the switches respond to the same direction of acceleration.

In accordance with an added feature of the invention, the common carrier is a semiconductor chip.

In accordance with another feature of the invention, the ignition circuit is disposed on the semiconductor chip.

In accordance with an additional feature of the invention, the evaluation circuit is disposed on the semiconductor chip.

The acceleration sensor unit according to the invention has at least one pendulum and at least two position sensors. In this context, a plurality of position sensors may be arranged on one side of the pendulum or in each case one position sensor may be arranged on one side of at least two pendulums. The pendulum, and in each case one associated position sensor, interact as a switch with a defined response threshold. At least one of the micromechanical switches is used as a safing sensor. Its sensor signal is evaluated separately from the sensor signals of the other switches. If the safing sensor does not supply a sensor signal the vehicle occupant protection system is not triggered even in the case of an ignition signal which is directed at an ignition circuit for the vehicle occupant protection system, is generated on the basis of the evaluation of the other sensor signals and is directed at an ignition circuit for the vehicle occupant protection system. The integrated safing sensor has a low response threshold and is manufactured together with the other switches in the same method steps in accordance with the methods of large-scale integration.

Other features which are considered as characteristic for the invention are set forth in the appended claims.

Although the invention is illustrated and described herein as embodied in a micromechanical sensor unit for detecting acceleration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a circuit block diagram of a control device for triggering motor vehicle occupant protection systems according to the invention; and FIG. 2 is a diagramatic, top-plan view of a sensor unit.

DESCRIPTION OF THE PREFERRED EMBODIMENTS

Referring now to the figures of the drawing in detail and first, particularly to FIG. 2 thereof, there is shown an accelerator sensor unit according to the invention containing at least one pendulum P/B which is manufactured using micromechanical technology. Each pendulum P/B has a seismic mass P and a spiral spring B. The seismic mass P is attached to a support E1–4 via the spiral spring B so as to be capable of oscillating in such a way that the seismic mass P can deflect at least transversely with respect to the longitudinal direction of the spiral spring B and is thus sensitive to acceleration in these directions. The pendulum P/B can also contain the seismic mass P which is formed solely by the spiral spring's B own inertial mass. The support E1–4 is attached to a housing component, a frame or to common carrier CH shown in FIG. 1.

Arranged next to each pendulum is at least one position sensor S. The position sensors S in FIG. 2 are electrically conductive stops. If the pendulum reaches, or touches, one of the position sensors S, an electrical sensor signal is produced in the form of a flow of current. The sensor signal has the quasi-binary states ON and OFF. In each case one position sensor S and the associated pendulum interact as a switch (P/B/S). The sensor unit has at least two switches which are sensitive to one direction of acceleration.

The response threshold of the switch depends on its geometric and component-specific properties, for example on the arrangement of the seismic mass P along the spiral spring B, the distance between the pendulum located in its position of rest and the position sensor S, the restoring force of the spiral spring B, and thus its shape and dimensioning, and on the size of the seismic mass P. The response thresholds of the various switches which are sensitive to the same direction of acceleration are different. If the sensor unit is subject to weak acceleration, only a few switches supply their sensor signals; in the case of strong acceleration, correspondingly more switches supply their signals. In the case of increasing and in the case of decreasing acceleration in this direction of acceleration, various switches generate their sensor signals successively.

FIG. 1 shows a control device for triggering motor vehicle air bags. The control device contains the acceleration sensor unit BS with a safing sensor SS as well as an ignition switch ZK which can be controlled by means of an ignition signal or instruction z via an ignition instruction bus. The ignition circuit ZK contains its own decision logic and, by itself, supplies ignition currents, at terminals AZ, for the triggering of motor vehicle airbags, on an application specific integrated circuit (ASIC) semiconductor chip such as the common carrier CH. If the sensor unit and the evaluation circuit $\mu$P which evaluates sensor signals, and possibly further circuit parts, are provided together on a semiconductor chip in a hybrid way or integrated way, the volume, weight and manufacturing complexity of the control device is reduced. The ignition circuit ZK can also physically form one common integrated unit, together with the evaluation circuit $\mu$P, for example a microprocessor, on one ASIC chip.

According to the invention, at least one of the aforesaid switches is constructed as the safing sensor SS. The safing sensor SS has the function, separately from the sensor signals of the other switches, of controlling the triggering of vehicle occupant protection systems in the motor vehicle in order to increase the reliability of the actuation of the vehicle occupant protection system. The safing sensor SS is dimensioned in such a way that it generates a sensor signal a short time after the occurrence of an acceleration force, for example in the event of an accident. For this purpose, it has a large seismic mass and a low intrinsic frequency. The safety device is triggered only if, in addition to the ignition signal z, the safing sensor SS also supplies a further sensor signal f to the ignition circuit ZK.

The safing sensor SS generates its sensor signal, generally before the sensor signals of the other switch units, on the basis of its low response threshold. Thus, the sensor signal of the safing sensor SS defines a time window, in which case the vehicle occupant protection device can only be triggered within this time window.

The evaluation circuit $\mu$P decides on the basis of the sensor signals of the other switches whether an ignition instruction z is supplied to the ignition circuit ZK. For this purpose, the sensor signals of the other switches are supplied either directly to the evaluation circuit $\mu$P, for example to digital inputs of a microprocessor, or superimposed by means of a resistance network to form a quasi-analog acceleration signal a, and fed in this form to the evaluation circuit $\mu$P. Incorrect ignition instructions which are generated for example as a result of defects of the microprocessor or as a result of potholes on the roads, no longer bring about the triggering of the vehicle occupant protection system because of the safing sensor.

If the safing sensor SS is formed by more than one of the switches, their sensor signals can also be superimposed by means of a resistance network to form a quasi-analog safing sensor signal. The safing sensor SS is manufactured micromechanically together with the other switch units BS on the common carrier CH, for example an ASIC semiconductor module, using the same method steps.

Each switch, that is to say even the safing sensor SS, can have a test element which is arranged next to the pendulum and serves to generate a deflection of the pendulum for testing purposes, and thus makes it possible to test the sensor unit/the safing sensor in the state in which it is already installed in the motor vehicle. The test element forms, together with the pendulum, a capacitor in which case, as a result of the application of a voltage to the test element, electrostatic forces act on the pendulum so strongly that the pendulum generates a sensor signal with at least one of its position sensors S.

We claim:

1. A control device for triggering a safety device in a motor vehicle, comprising;

a common carrier;

an ignition circuit;

an acceleration sensor unit being of micromechanical construction and disposed on said common carrier, said acceleration sensor unit supplying sensor signals;

an evaluation circuit evaluating said sensor signals and supplying an ignition signal to said ignition circuit;

a safing sensor being of micromechanical construction and disposed on said common carrier supplying a further sensor signal to said ignition circuit for the detection of acceleration;

said ignition circuit triggering the safety device when said ignition signal and said further sensor signal are present at said ignition circuit simultaneously;

said safing sensor having a pendulum with a spring and a seismic mass, a support being connected to said pendulum and a position sensor, said position sensor and said pendulum forming a switch with a defined triggering threshold;

said acceleration sensor unit having at least one pendulum with a spring and a seismic mass, at least one support being connected to said at least one pendulum, and at least two position sensors, each of said at least two position sensors being associated with said at least one pendulum for forming a switch with a defined triggering threshold; and said switch formed from said safing sensor and at least one switch formed from said acceleration sensor unit responding to the same direction of acceleration.

2. The control device recited in claim 1, wherein said common carrier is a semiconductor chip.

3. The control device recited in claim 2, wherein said ignition circuit is disposed on said semiconductor chip.

4. The control device as recited in claim 3, wherein said evaluation circuit is disposed on said semiconductor chip.

* * * * *